United States Patent
Lee et al.

(10) Patent No.: US 7,489,375 B2
(45) Date of Patent: Feb. 10, 2009

(54) LIQUID CRYSTAL DISPLAY DEVICE AND METHOD OF FABRICATING THE SAME

(75) Inventors: Hye-Sun Lee, Seoul (KR); Jae-Young Oh, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 224 days.

(21) Appl. No.: 11/644,983

(22) Filed: Dec. 26, 2006

(65) Prior Publication Data

US 2007/0153160 A1    Jul. 5, 2007

(30) Foreign Application Priority Data

Dec. 29, 2005    (KR) ..................... 10-2005-0134612

(51) Int. Cl.
*G02F 1/1335* (2006.01)
(52) U.S. Cl. ...................................... 349/108; 349/106
(58) Field of Classification Search .................. 349/106, 349/108
See application file for complete search history.

(56) References Cited

U.S. PATENT DOCUMENTS 7,282,843 B2 * 10/2007 Kiguchi et al. .............. 313/112

* cited by examiner

*Primary Examiner*—David Nelms
*Assistant Examiner*—Phu Vu
(74) *Attorney, Agent, or Firm*—McKenna Long & Aldridge, LLP

(57) ABSTRACT

An LCD device and a method of fabricating the same is disclosed, which can prevent transmitting light from being mixed in adjacent pixels, the LCD device including: a plurality of etching patterns formed in an insulation substrate; a plurality of color filter patterns of red, green and blue colors formed in the respective etching patterns; a black matrix pattern formed on the insulation substrate between each of the color filter patterns; and an overcoat layer formed on an entire surface of the insulation substrate including the black matrix pattern.

16 Claims, 6 Drawing Sheets ered art LCD device will be described
LIQUID CRYSTAL DISPLAY DEVICE AND METHOD OF FABRICATING THE SAME This application claims the benefit of Korean Patent Application No. 10-2005-0134612, filed on Dec. 29, 2005, which is hereby incorporated by reference for all purposes as if fully set forth herein.

BACKGROUND OF THE INVENTION

1. Field of the Invention

The present invention relates to a liquid crystal display (LCD) device and a method of fabricating the same, and more particularly, to an LCD device that may prevent light in adjacent pixel regions from being mixed to prevent picture quality from deteriorating, and a method of fabricating the same.

2. Discussion of the Related Art

Because of increased visual presentation of information, display devices have received much attention. Accordingly, various kinds of competitive display devices have been researched and developed. To gain a large market share, it is necessary for a display device to have the advantageous properties of the low power consumption, thin profile, light weight, and good picture quality.

In the past, a cathode ray tube (CRT) was widely used. However, the CRT is not thin nor light weight as desired today. Accordingly, many efforts have been made to develop various flat display devices that can substitute for the CRT. Among the various flat display devices, a liquid crystal display (LCD) device has attracted much attention due to it performance and ease of mass production. Thus, the LCD device is widely used in various fields from television to navigation systems.

Generally, the LCD device has liquid crystal cells arranged in a matrix. A data signal is individually provided to each liquid crystal cell, to thereby control the light transmittance of the liquid crystal cell. As a result, a desired image is displayed on the LCD device.

The LCD device includes an LCD panel, wherein the LCD panel includes a thin film transistor array substrate, a color filter substrate, and a liquid crystal layer formed between the two substrates.

Hereinafter, a related art LCD device will be described with reference to FIG. 1.

FIG. 1 illustrates a structure of a related art LCD device. As shown in FIG. 1, the related art LCD device includes an upper color filter substrate, a lower thin film transistor array substrate 101, and a liquid crystal layer 109.

The color filter substrate includes a color filter 117 formed on a substrate 113, a black matrix (BM) 115 formed between each color filter 117, and a common electrode 111 formed on the color filter 117 and the black matrix 115.

The thin film transistor array substrate 101 includes a pixel electrode 107 formed in each pixel region (P) of a substrate, a thin film transistor (TFT) that functions as a switching element, and array lines 103 and 105. The thin film transistor (TFT) is formed in each pixel region (P) defined by gate and data lines 103 and 105 formed substantially perpendicular to one another. In the pixel region (P), the pixel electrode 107 is formed of a transparent conductive layer.

The liquid crystal layer 109 is formed between the thin film transistor array substrate 101 and the color filter substrate, wherein the liquid crystal layer 109 is formed of liquid crystal having a refractive anisotropy.

Although not shown in FIG. 1, polarizing sheets are formed on outer surfaces of the LCD panel. Then, a backlight unit including a lamp and optical sheets is below the polarizing sheet of the lower substrate. Below the polarizing sheet formed on the lower surface of the lower substrate, there are top and bottom cases to support the LCD panel.

FIG. 2 is a cross sectional view illustrating a related art LCD panel. FIG. 3 is an enlarged cross sectional view illustrating a color filter substrate of an LCD panel shown in FIG. 2.

As shown in FIG. 2, the polarizing sheets 119a and 119b are formed on the lower surface of the thin film transistor array substrate 101 and on the upper surface of the color filter substrate 113. FIG. 2 shows only one pixel region (P). The LCD panel includes a plurality of pixel regions (P), as explained in FIG. 1. Although not shown in FIG. 2, the liquid crystal layer is formed by liquid crystal between the pixel electrode 107 and the common electrode 111.

As shown in FIG. 3, the color filter substrate 113 includes the black matrix 115 of metal or black resin formed along the circumstance of the pixel region, and the color filters of red (R), green (G) and blue (B) 117a, 117b and 117c sequentially and repeatedly formed between each black matrix 115. Then, an overcoat layer 112 is formed on the color filters 117a, 117b and 117c, and the common electrode 111 is formed on the overcoat layer 112. At this time, the common electrode 111 is formed of a transparent conductive layer, for example, Indium Tin Oxide (ITO). Then, the polarizing sheet 119a is formed on the lower surface of the color filter substrate.

A method of fabricating the above-mentioned color filter substrate will be explained with reference to FIGS. 4A to 4E. The color filter substrate is formed by using a pigment dispersion method having high color-realization properties.

As shown in FIG. 4A, the metal material or black resin, which can block the light, is formed on the entire surface of the substrate 113 and is then etched by photolithography, thereby forming the pattern of black matrix 115. When liquid crystal molecules are abnormally aligned due to distorted electric fields, the light may leak. The black matrix prevents light from leaking and also prevents a photocurrent from occurring due to light being incident on a channel region of the thin film transistor.

As shown in FIG. 4B, the entire surface of the substrate 113 including the black matrix 115 is coated with a color resist layer 116 of any one color of red, green and blue colors, for example, a red-color resist material by a spin-coating method, whereby a red-color resist layer 116 is formed on the substrate 113. After aligning a photo-mask 114 above the red-color resist layer 116 of the substrate 113, the exposure process is performed thereto. Thereafter, when developing the red-color resist layer 116, the portions-exposed to the light are left and the other portions unexposed to the light are removed, as shown in FIG. 4C, due to the negative development properties of the red-color resist layer 116, whereby the red color filter pattern 117a is formed. Then, the red color filter pattern 117a is cured. By repeatedly performing the above-mentioned process for the green-color resist and the blue-color resist, as shown in FIG. 4D, the green and blue color filter patterns 117b and 117c are formed, and the overcoat layer 112 and the common electrode 111 are formed.

The green and blue color filter patterns 117b and 117c are formed in the same method as that of the red color filter pattern 117a. Then, a transparent conductive material, for example, Indium Tin Oxide (ITO) or Indium Zinc Oxide (IZO), is formed on the entire surface of the substrate including the red, green and blue color filter patterns 117a, 117b and 117c and is then patterned by photolithography, thereby forming the common electrode 111. In this case, the overcoat layer 112 of BenzoCycloButene (BCB) is formed between the common electrode 111 and the color filter patterns 117a, 117b and 117c, to thereby protect the color filter patterns 117a, 117b and 117c and to compensate for the step coverage between the common electrode 111 and the color filter patterns 117a, 117b and 117c.

Subsequently, as shown in FIG. 4E, the polarizing sheet 119a is adhered onto the lower surface of the color filter substrate. The polarizing sheets 119a and 119b adhered onto the color filter substrate and the thin film transistor array substrate control the transmittance of light emitted from the backlight unit.

For the LCD panel fabricated by the related art, each pixel region is independently driven by its thin film transistor that functions as a switching element. Also, the black matrix is provided between each of the pixel regions, whereby each pixel may independently display the corresponding color.

However, the transmitted light may be mixed in the adjacent pixel regions of the related art LCD device, whereby the color purity of unit pixel region deteriorates due to the mixed light.

SUMMARY OF THE INVENTION

Accordingly, the present invention is directed to a liquid crystal display device and a method of fabricating the same that substantially obviates one or more of the problems due to limitations and disadvantages of the related art.

An advantage of the present invention is to provide an LCD device having a color filter pattern formed in a shape of a convex lens to refract light in a pixel region, to thereby prevent light from being mixed in the adjacent pixel regions, and a method of fabricating the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an LCD device includes: a plurality of etching patterns formed in an insulation substrate; a plurality of color filter patterns of red, green and blue colors formed in the respective etching patterns; a black matrix pattern formed on the insulation substrate between each of the color filter patterns; and an overcoat layer formed on an entire surface of the insulation substrate including the black matrix pattern.

In another aspect of the present invention, a method of fabricating a liquid crystal display device includes: forming a black matrix pattern on an insulation substrate; forming an etching pattern in the insulation substrate by etching the insulation substrate using the black matrix pattern as a mask; forming a color filter pattern in the etching pattern of the insulation substrate; and forming an overcoat layer on the insulation substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to an embodiment of the present invention, examples of which is illustrated in the accompanying drawings.

Hereinafter, an LCD device according to the present invention and a method of fabricating the same will be described with reference to the accompanying drawings.

Figure 1:
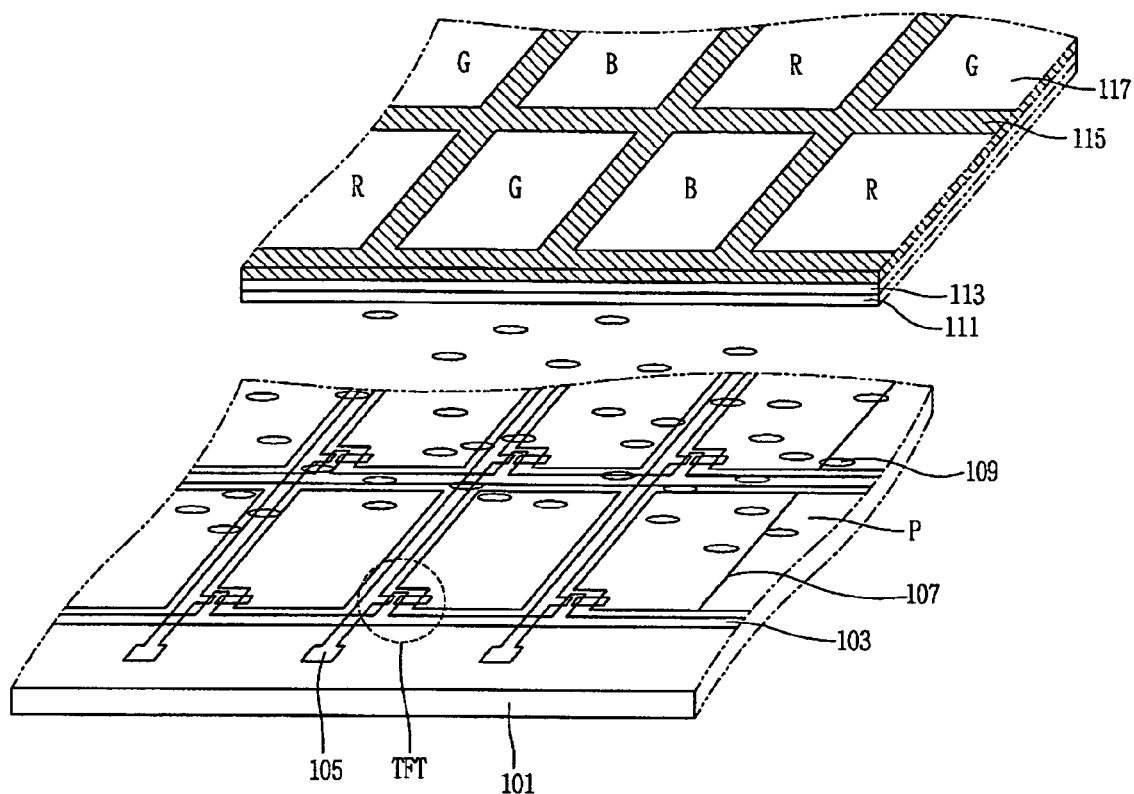
FIG. 1 is an exploded view illustrating a related art LCD device.
Figure 2:
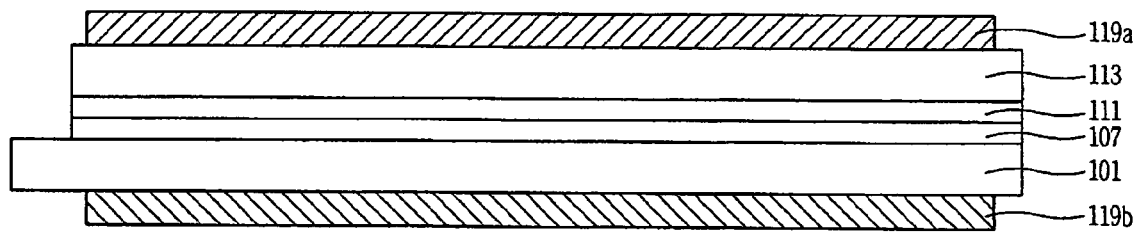
FIG. 2 is a cross section view illustrating a related art LCD device.
Figure 3:
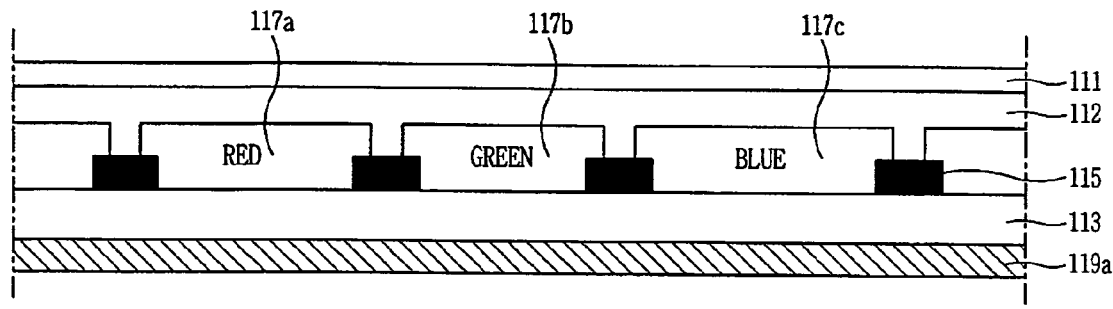
FIG. 3 is a cross section view illustrating a related art color filter substrate.
Figure 4A:
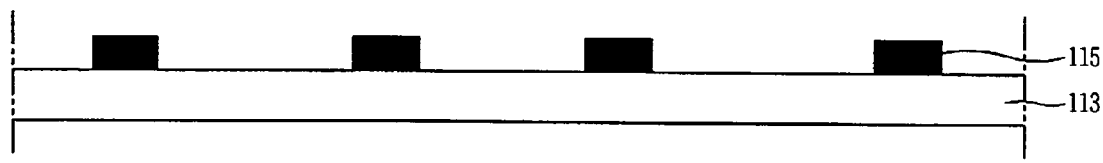
FIGS. 4A to 4E are cross section views illustrating a method for fabricating a related art color filter substrate.
Figure 4B:
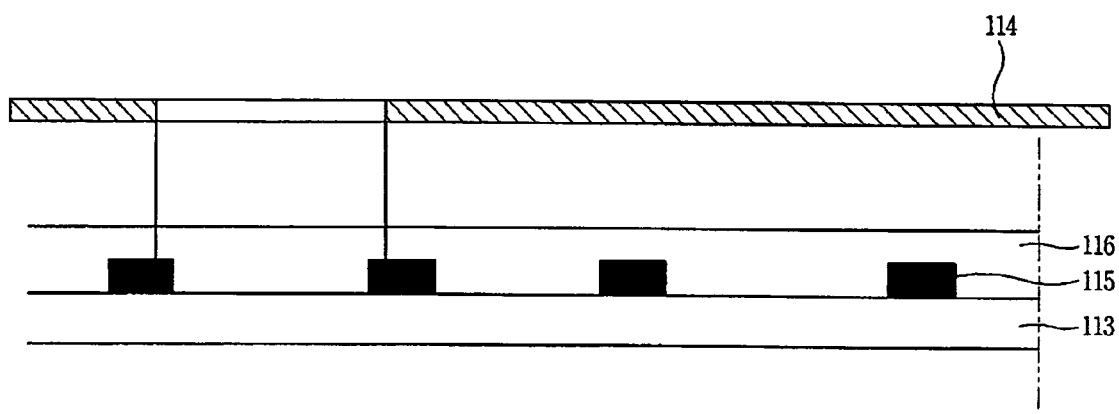
Figure 4C:
Figure 4D:
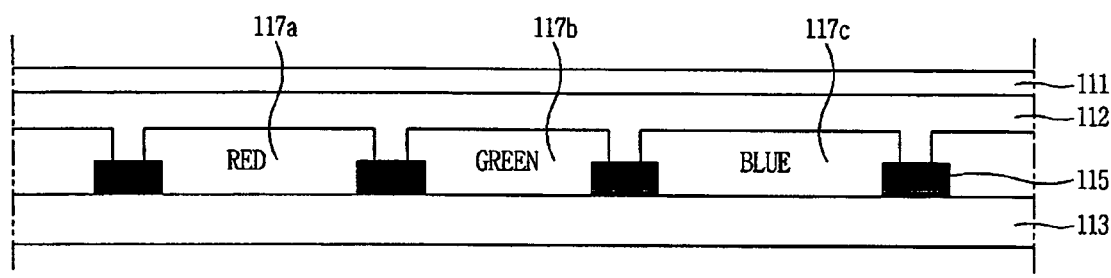
Figure 4E:
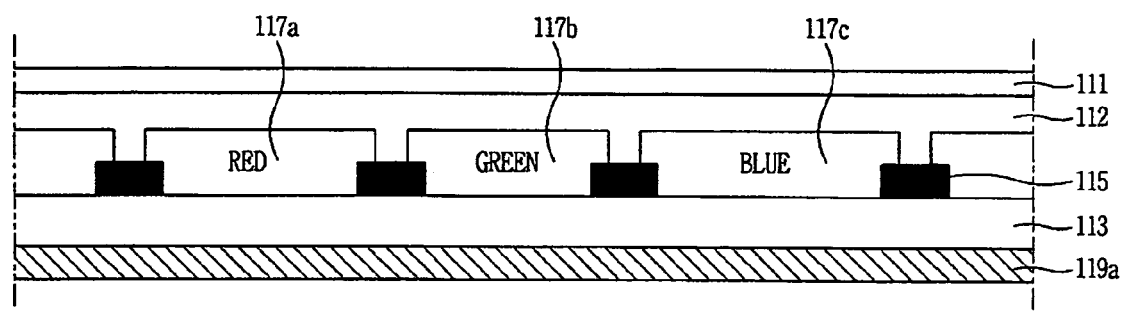
Figure 5:
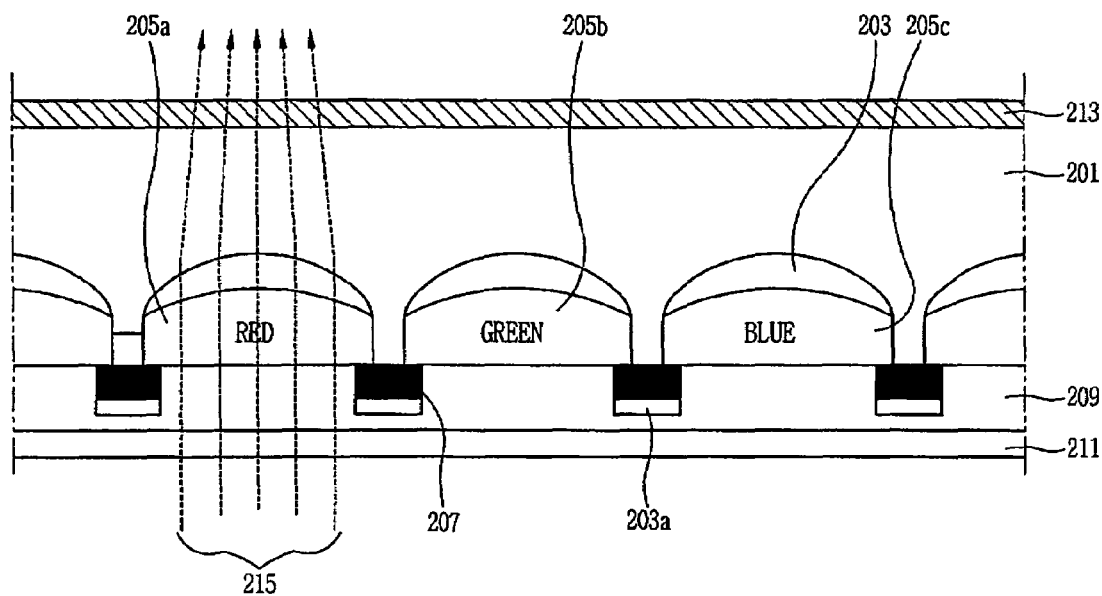
FIG. 5 is a cross section view illustrating a color filter substrate according to the present invention.

FIG. 5 is a cross section view of illustrating a color filter substrate according to the present invention.

First, a plurality of predetermined etching patterns are formed in an insulation substrate 201 by an etching method, wherein the insulation substrate 201 may be formed of a glass material. The etching patterns are formed in shape of dots on a color filter substrate, wherein the etching patterns on the upper substrate are positioned corresponding to pixel regions of a lower substrate of a thin film transistor array substrate. Preferably, the bottom of the etching pattern is rounded.

Then, color filter patterns 205a, 205b and 205c are formed in the respective etching patterns of the insulation substrate 201. The color filter patterns 205a, 205b and 205c are formed of red, green and blue colors that are repeatedly arranged in sequence. Thus, each of color filter patterns determines a corresponding color for each pixel to display a color image.

From the cross sectional view, each of the color filter patterns 205a, 205b and 205c has a cross section in shape of a convex lens. This is because the insulation substrate 201 has the curved portions corresponding to the color filter patterns 205a, 205b and 205c. That is, the lower portion of the color filter pattern 205a, 205b and 205c is formed in the curved portion of the insulation substrate 201, and the upper portion of the color filter pattern 205a, 205b and 205c is flattened. Accordingly, each of the color filter patterns 205a, 205b and 205c is formed in shape of the convex lens. Further, a refractive lens 203 made of a transparent layer may be formed in each of the etching patterns of the insulation substrate 201.

At this time, the color filter pattern 205a, 205b and 205c and the refractive lens 203 are generally formed of materials having a refractive index of 1.5 or more, wherein the refractive index of 1.5 corresponds to a refractive index of a glass substrate. When the color filter pattern and the refractive lens have the refractive index above 1.5, they function as the convex lens to concentrate the light. Generally, because the color filter material has a refractive index above 1.5, the color filter patterns function as the convex lens without any difficulties. Also, the refractive lens may be formed of diamond like carbon (DLC) having the refractive index of about 2.5.

As mentioned above, the color filter patterns 205a, 205b and 205c and the refractive lens 203 are formed in shape of a convex lens. Thus, when the light 215 emitted from the backlight passes through the color filter substrate, the light is concentrated towards the central portion of the pixel region due to the light refractive properties between the two mediums having the different refractive indexes. Accordingly, it is possible to prevent the light transmitting through the adjacent-pixels from being mixed.

Next, a black matrix 207 is formed on the non-etched portion of the insulation substrate 201 between each of the color filter patterns 205a, 205b and 205c. That is, the black matrix 207 is on areas of the color filter substrate corresponding to the circumference of the pixel region of the thin film transistor array substrate. As a result, the black matrix 207 prevents the cross-talk between pixels from occurring, wherein the cross-talk may occur due to an electric field that is unstably generated in the liquid crystal layer by signals applied to various lines formed on the thin film transistor array substrate. At this time, the black matrix 207 may be formed of a metal layer or a black resin that may block the light emitted from the backlight unit. Then, a material 203a for the refractive lens may be deposited on the black matrix 207.

Then, an overcoat layer 209 may be formed on the entire surface of the substrate including the black matrix 207, wherein the overcoat layer 209 may be formed of BenzoCycloButene (BCB). The overcoat layer 209 protects the color filter patterns 205a, 205b and 205c, and compensates for the step coverage therebelow because the overcoat layer 209 is formed by coating of an organic layer.

Also, a common electrode 211 is formed on the overcoat layer 209, wherein the common electrode 211 is formed of a transparent conductive material, for example, Indium Tin Oxide (ITO) or Indium Zinc Oxide (IZO). The common electrode 211 may be formed on the thin film transistor array substrate. In other words, if the LCD device is formed by Twisted Nematic (TN) mode as shown in the drawings, the common electrode 211 is formed on the overcoat layer 209. However, if the LCD device is formed by In Plane Switching (IPS) mode, the common electrode is formed on the thin film transistor array substrate. Then, an polarizing sheet 213 is adhered to the outer surface of the substrate having no color filter pattern.

Hereinafter, a method of fabricating the color filter substrate of the LCD device according to the present invention will be explained with reference to FIGS. 6A to 6F.

Figure 6A:
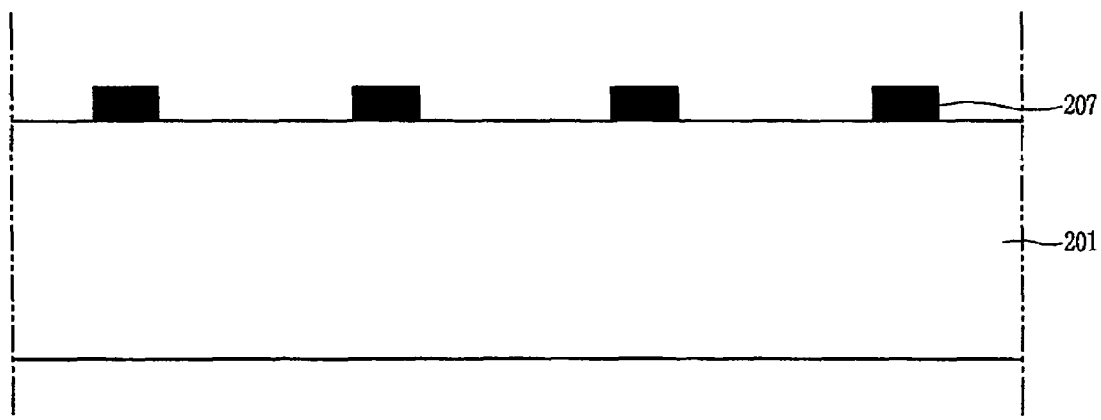
FIGS. 6A to 6F are cross section views illustrating a method for fabricating a color filter substrate according to the present invention.
Figure 6B:
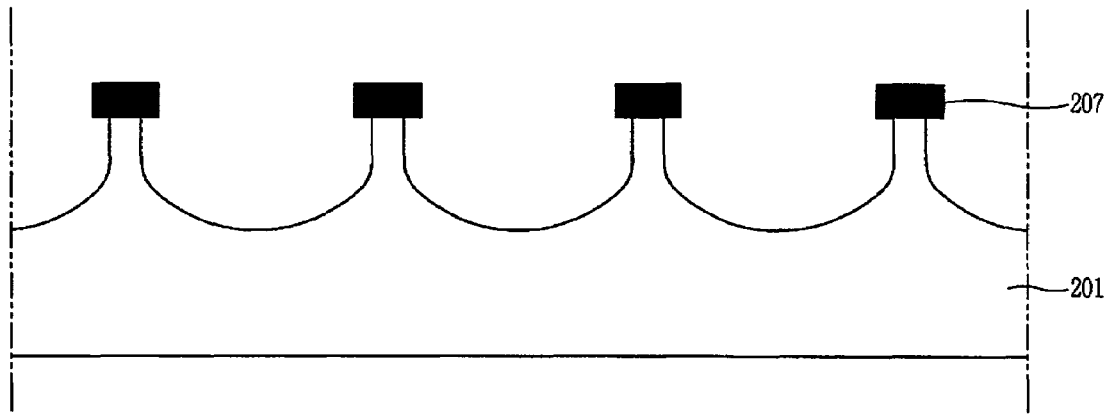

First, as shown in FIG. 6A, the black matrix pattern 207 is formed on the insulation substrate 201 of glass material. To form the black matrix pattern 207, a metal material such as chrome (Cr) may be deposited on the substrate by sputtering, or black resin may be coated onto the substrate by the spin-coating method. The metal material or black resin is then etched by photolithography. After that, as shown in FIG. 6B, the insulation substrate 201 is etched by using the black matrix pattern 207 as a mask. At this time, a wet-etching method using an etchant of fluoric acid (HF) may be used to etch the insulation substrate 201. The bottom of the etched pattern is curved because of the isotropic etching properties of the wet-etching method. That is, the etching rate in the large space between each black matrix is higher than the etching rate in the small space between each black matrix owing to the contact angle between the etchant and the black matrix pattern.

Figure 6C:
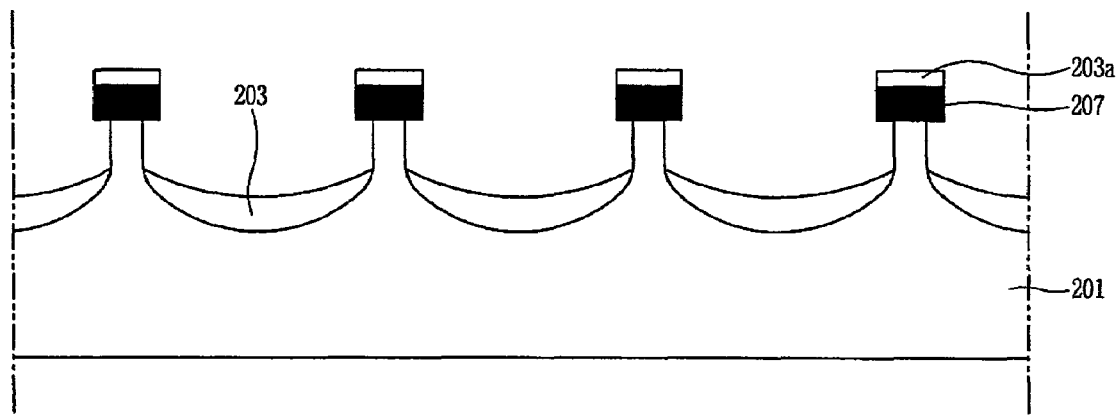

As shown in FIG. 6C, a transparent material is deposited inside the etched portion of the insulation substrate 201, thereby forming the refractive lens 203. At this time, the refractive lens 203 may be formed of transparent material, for example, DLC (Diamond Like Carbon), of which refractive index is higher than that of the insulation substrate 201. The refractive lens 203 is formed by CVD (Chemical Vapor Deposition). Depending on the process conditions of CVD, the material-deposition rate in the flattened surface is different from the material-deposition rate in the inclined surface. Generally, the material-deposition rate in the flattened surface is higher than the material-deposition rate in the inclined surface.

If forming the transparent material by CVD, its central portion corresponding to the center of the pixel region is relatively thick, and its side portion is relatively thin, whereby the transparent material has the cross section in shape of a convex lens. Also, the process of forming the refractive lens 203 may be omitted. In this case, the color filter patterns 205a, 205b and 205c are directly formed on the insulation substrate 201. When forming the refractive lens 203, the transparent material is formed on the black matrix 207 (203a). Even though the transparent material is formed on the black matrix 207, it has no negative effects on the operation of the LCD device. Accordingly, it is unnecessary to prevent the transparent material from being formed on the black matrix by using an additional mask and it is unnecessary to remove the transparent material from the black matrix by an additional process.

Figure 6D:
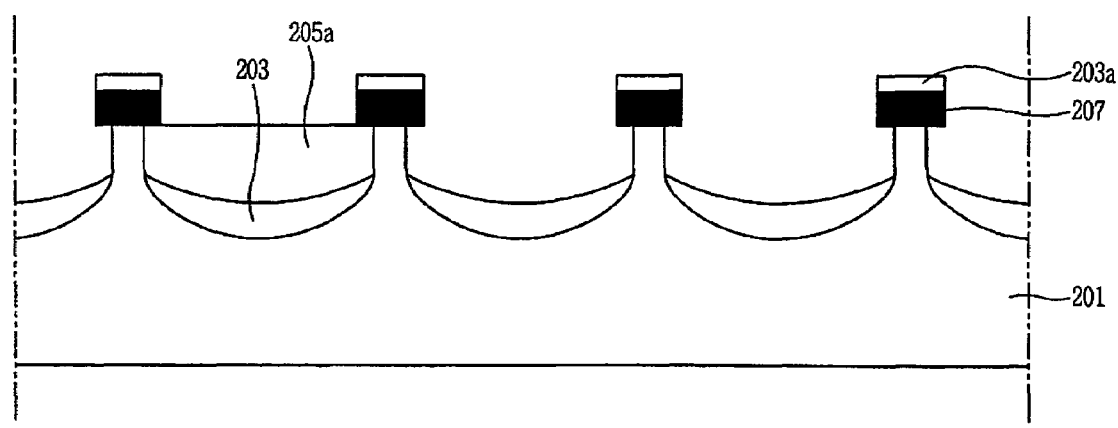

As shown in FIG. 6D, any one of red, green and blue color filter patterns is formed inside the etching pattern of the insulation substrate 201 including the refractive lens 203. For example, the red-color filter pattern 205a is formed inside the etching pattern of the insulation substrate 201. At this time, the color filter pattern 205 may be formed in a pigment-dispersion method or an ink-jet method.

After coating the color resist material on the entire surface of the substrate by the pigment-dispersion method, the coated color resist material corresponding to the pixel region is exposed by using the photo-mask patterned along the pixel region. Then, the color resist material having the changed photochemical structure is dipped into a developer. At this time, the general color resist material has the negative-resist properties, whereby the unexposed portion is removed. The above-mentioned process is repeatedly performed for the blue and green color resist materials, whereby the red, green and blue color filter patterns are formed.

If using the ink-jet method, a corresponding color material is sprayed onto each pixel region by an ink-jet sprayer positioned above the substrate and moved along the pattern. Thus, the sprayed color material of red, green and blue is cured at a predetermined temperature, thereby forming the color filter patterns.

Figure 6E:
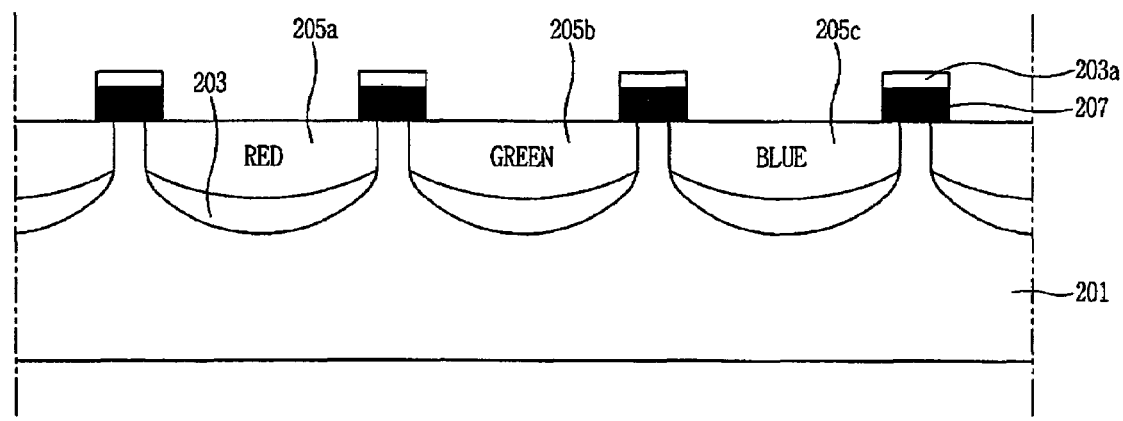

After forming the red color filter pattern, as shown in FIG. 6E, the green and blue color filter patterns 205b and 205c are formed on the substrate by repeatedly performing the above-mentioned process used to form the red color filter pattern 205a. At this time, the same photo-mask used for forming the red color filter pattern 205a is shifted to form the green and blue color filter patterns 205b and 205c.

Figure 6F:
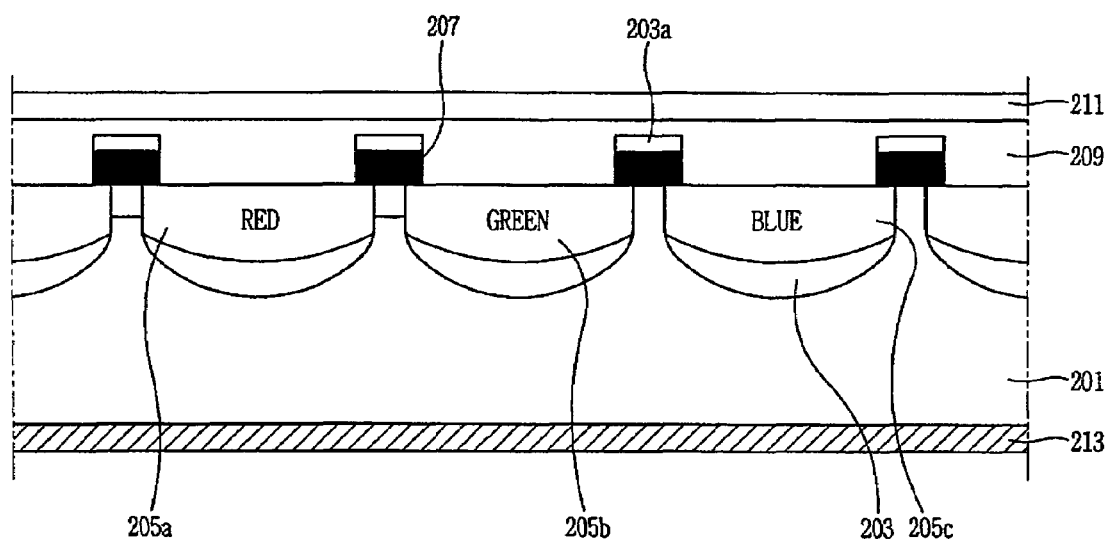

After that, as shown in FIG. 6F, the organic material of BenzoCycloButene (BCB) is formed on the entire surface of the substrate including the red, green and blue color filter patterns 205a, 205b and 205c by a spin-coating method, thereby forming the overcoat layer 209. Then, the transparent conductive material of ITO or IZO is formed on the overcoat layer 209 and is then etched, thereby forming the common electrode 211. Then, the polarizing sheet 213 is adhered to the lower surface of the substrate.

In the LCD device including the color filter substrate according to the present invention, the color filter pattern is formed in the shape of a convex lens. Thus, as the light emitted from the backlight unit passes through the color filter substrate, the light is concentrated towards the central portion of each pixel region. Also, the refractive lens having the shape of a convex lens is provided below the color filter layer, whereby the light is also concentrated towards the central portion of the pixel region. Accordingly, it is possible to prevent the transmitted light from being mixed in the adjacent pixel regions, that is, to prevent the problem where the light is mixed as in the related art.

Also, after forming the black matrix pattern, the lower portion of the insulation substrate is etched by the wet-etching method using the black matrix pattern as the mask. As a result, it is possible to etch the insulation substrate without additional photolithography, thereby realizing a simplified process.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
   a plurality of etching patterns in an insulation substrate;
   a plurality of color filter patterns of red, green and blue colors in the respective etching patterns; and
   a black matrix pattern on the insulation substrate between each of the color filter patterns.

2. The liquid crystal display device of claim 1, further comprising a refractive lens inside the etching pattern of the insulation substrate.

3. The liquid crystal display device of claim 2, wherein the refractive lens is a convex lens.

4. The liquid crystal display device of claim 2, wherein the refractive lens is formed of diamond like carbon (DLC).

5. The liquid crystal display device of claim 1, wherein the etching pattern of the insulation substrate includes a rounded bottom.

6. The liquid crystal display device of claim 1, wherein the color filter pattern is formed in a shape of a convex lens.

7. The liquid crystal display device of claim 1, further comprising a common electrode on the overcoat layer.

8. The liquid crystal display device of claim 1, further comprising an overcoat layer on an entire surface of the insulation substrate including the black matrix pattern.

9. A method of fabricating a liquid crystal display device comprising:
   forming a black matrix pattern on an insulation substrate;
   forming an etching pattern in the insulation substrate by etching the insulation substrate using the black matrix pattern as a mask; and
   forming a color filter pattern in the etching pattern of the insulation substrate.

10. The method of claim 9, wherein the etching pattern in the insulation substrate has a curved bottom.

11. The method of claim 9, wherein the etching pattern is formed by a wet-etching method.

12. The method of claim 9, further comprising forming a refractive lens in the etching pattern of the insulation substrate.

13. The method of claim 12, wherein the material-deposition rates in the flat portion of the refractive lens is higher than that of the inclined portion of the refractive lens.

14. The method of claim 12, wherein the refractive lens is formed of diamond like carbon (DLC).

15. The method of claim 9, further comprising forming a common electrode on the overcoat layer.

16. The method of claim 9, further comprising forming an overcoat layer on the insulation substrate.

* * * * *